(12) United States Patent
Florin et al.

(10) Patent No.: US 8,552,380 B1
(45) Date of Patent: Oct. 8, 2013

(54) IR DETECTOR

(75) Inventors: Udrea Florin, Cambridge (GB); Julian Gardner, Kineton (GB); Syed Zeeshan Ali, Cambridge (GB); Mohamed Foysol Chowdhury, Milton (GB); Ilie Poenaru, Cambridge (GB)

(73) Assignee: Cambridge CMOS Sensors Limited, Cambridge (GB)

( * ) Notice: Subject to any disclaimer, the term of this patent is extended or adjusted under 35 U.S.C. 154(b) by 0 days.

(21) Appl. No.: 13/466,662

(22) Filed: May 8, 2012

(51) Int. Cl.
*G01J 5/20* (2006.01)
(52) U.S. Cl.
USPC ............................................. 250/338.4
(58) Field of Classification Search
USPC .......................................... 250/338.1–338.5
See application file for complete search history.

(56) References Cited

U.S. PATENT DOCUMENTS

| | | | |
|---|---|---|---|
| 5,834,777 A | | 11/1998 | Wong |
| 5,982,014 A | * | 11/1999 | Paige ............................ 257/467 |
| 6,342,667 B1 | | 1/2002 | Shen et al. |
| 6,348,650 B1 | | 2/2002 | Endo et al. |
| 6,388,186 B1 | | 5/2002 | Nomura et al. |
| 6,677,654 B2 | | 1/2004 | Kim et al. |
| 6,777,961 B2 | | 8/2004 | Hamamoto et al. |
| 7,244,939 B2 | | 7/2007 | Stuttard |
| 7,541,587 B2 | | 6/2009 | Cutler et al. |
| 7,785,002 B2 | | 8/2010 | Dewes et al. |
| 2007/0102639 A1 | | 5/2007 | Cutler et al. |
| 2008/0239322 A1 | | 10/2008 | Hodgkinson et al. |
| 2008/0308733 A1 | | 12/2008 | Doncaster |
| 2012/0061569 A1 | * | 3/2012 | Noguchi ................... 250/338.3 |
| 2012/0267532 A1 | * | 10/2012 | Udrea et al. ............... 250/338.5 |

FOREIGN PATENT DOCUMENTS

| | | | |
|---|---|---|---|
| JP | 03236288 | A * | 10/1991 |
| JP | 04360588 | A * | 12/1992 |

OTHER PUBLICATIONS

Schneeberger et al., "Optimized CMOS Infrared Detector Microsystems", Proc. IEEE Tencon 1995, pp. 198-201.
G.D. Nieveld, "Thermopiles Fabricated using Silicon Planar Technology", Sensors and Actuators 3 (1982/83), pp. 179-183.
Allison et al., "A bulk micromachined silicon thermopile with high sensitivity", Sensors and Actuators A 104 (2003) pp. 32-39.
Lahiji et al., "A Batch-Fabricated Silicon Thermopile Infrared Detector", IEEE Transactions on Electron Devices, 1992, pp. 14-22.
Lenggenhager et al., "Thermoelectric Infrared Sensors by CMOS Technology", IEEE Electron Device Letters, vol. 13, No. 9, Sep. 1992.

(Continued)

*Primary Examiner* — Kiho Kim
(74) *Attorney, Agent, or Firm* — Renner, Otto, Boisselle & Sklar, LLP

(57) ABSTRACT

An IR detector in the form of a thermopile including one or more thermocouples on a dielectric membrane supported by a silicon substrate. Each thermocouple is composed of two materials, at least one of which is p-doped or n-doped single crystal silicon. The device is formed in an SOI process. The device is advantageous as the use of single crystal silicon reduces the noise in the output signal, allows higher reproducibility of the geometrical and physical properties of the layer and in addition, the use of an SOI process allows a temperature sensor, as well as circuitry to be fabricated on the same chip. The detector can also have an IR filter wafer bonded onto it and/or have arrays of thermopiles to increase the sensitivity. The devices can also be integrated with an IR source on the same silicon chip and packaged to form a complete and miniaturised NDIR sensor.

48 Claims, 20 Drawing Sheets

(56) References Cited

OTHER PUBLICATIONS

Graf et al., "Review of micromachined thermopiles for infrared detection", Measurement Science and Technology, 18 (2007) R59-R75.

Kim et al., "A new uncooled thermal infrared detector using silicon diode", Sensors and Actuators A, 89 (2001) pp. 22-27.

Eminoglu et al., "Low-cost uncooled infrared detectors in CMOS process", Sensors and Actuators A 109 (2003) pp. 102-113.

Parameswaran et al., "Micromachined Thermal Radiation Emitter from a Commercial CMOS Process", IEEE Electron Device Letters, vol. 12, No. 2, Feb. 1991.

Barritault et al., "Mid-IR source based on a free-standing microhotplate for autonomous $CO_2$ sensing in indoor applications", Sensors and Actuators A 172 (2011) pp. 379-385.

Fordl et al., "A High-Precision NDIR $CO_2$ gas sensor for automotive applications", IEEE Sensors Journal, vol. 6, No. 6, 2006.

* cited by examiner

IR DETECTOR

FIELD OF THE INVENTION

This invention relates to an Infra-Red (IR) detector based on a thermopile fabricated on a microchip with a membrane for thermal isolation. A thermopile is made of several thermocouples placed in series. The invention also relates to integrating the IR detector with an IR source to make a Non Dispersive Infra-Red (NDIR) sensor.

BACKGROUND TO THE INVENTION

It is known to fabricate thermal IR detectors on a silicon substrate consisting of a thin membrane layer (made of electrically insulating layers) that is formed by etching of part of the substrate. Incident IR radiation increases the temperature of the membrane—which can be measured by either a thermopile, a resistor, or a diode.

For Example, Schneeberger et. al "Optimized CMOS Infrared Detector Microsystems," Proc IEEE Tencon 1995, reports fabrication of CMOS IR detectors based on thermopiles. The thermopile consists of several thermocouples connected in series. KOH is used to etch the membrane and improve the thermal isolation. Each thermocouple consists of 2 strips of different materials, connected electrically and forming a thermal junction at one end (termed hot junction) while the other ends of the material are electrically connected to other thermocouples in series forming a thermal cold junction. The hot junctions of the thermocouples are on the membrane, while the cold junction is outside the membrane. Three different designs of the thermocouples are given in the paper with different material compositions: Aluminium and p-doped polysilicon, Aluminium and n-doped Polysilicon, or p-doped polysilicon and n-doped polysilicon. Incident IR radiation causes a slight increase in temperature of the membrane. The Seebeck effect causes a slight voltage difference across each thermocouple—resulting in a much large increase in voltage difference across the thermopile which is the sum of the voltages across each thermocouple.

Previously, Nieveld "Thermopiles Fabricated using Silicon Planar Technology," Sensors and Actuators 3 (1982/83) 179-183, showed the fabrication of a thermopile on a microchip based on aluminium and single crystal silicon P+ as the materials in the thermocouple. It should be noted that this was a general thermopile device—not intended for IR detection and the thermopile was not on a membrane.

Allison et. al, "A bulk micromachined silicon thermopile with high sensitivity," Sensors and Actuators A 104 2003 32-39, describes a thermopile based on single crystal silicon P-doped and N-doped materials. However, these are formed by waferbonding of a P-type wafer and an N-type wafer and is also not specifically for use as an IR detector. The fabrication method is also very expensive.

Lahiji et. al., "A Batch-fabricated Silicon Thermopile Infrared Detector," IEEE Transactions on Electron Devices" 1992, describe two thermopile IR detectors, one based on Bismuth-antimony thermocouples, and the other based on polysilicon and gold thermocouples.

U.S. Pat. No. 7,785,002 describes an IR detector with a thermopile based on P and N doped polysilicon. Langgenhager "Thermoelectric Infrared Sensors by CMOS Technology," IEEE EDL 1992, describes IR detectors consisting of thermopiles on a suspended structure consisting of aluminium and polysilicon.

Several other Thermopile devices are described by Graf et. al. "Review of micromachined thermopiles for infrared detection," Meas. Sci. Technol. 2007.

Another method of measuring the IR radiation is by the use of thermodiodes. For example, Kim "A new uncooled thermal infrared detector using silicon diode," S&A A 89, 2001, describes a diode fabricated by micromachining for use as an IR detector.

Eminoglu "Low-cost uncooled infrared detectors in CMOS process," S&A A 109 (2003), describes IR detectors made using a CMOS process with diodes on a suspended membrane.

Similarly thermodiode based IR detectors can also be made using an SOI process. However, thermodiodes have the disadvantage that they need a biased voltage or current—which requires power. In addition, it has a high base voltage, which makes it harder to measure small changes in the output voltage.

It is also known to fabricate IR sources in silicon technology. For Example, Parameswaran et. al. "Micro-machined thermal emitter from a commercial CMOS process," IEEE EDL 1991 reports a polysilicon heater as an IR source made in CMOS technology, with a front side etch to suspend the heater and hence reduce power consumption. Barritault et. al "Mid-IR source based on a free-standing microhotplate for autonomous CO2 sensing in indoor applications" (Sensors & Actuators A 2011) describe a micromachined IR source based on a platinum heater. Several other such devices have also been reported.

It is also known to make NDIR sensors, for example, Fordl and Tille "A High-Precision NDIR CO2 gas sensor for automotive applications" IEEE Sensors Journal vol 6 No. 6 2006, and US2007/0102639 by Cutler et. al describe typical NDIR sensors consisting of a filament bulb as an IR source, and a thermopile based IR detector. The two are placed at the opposite ends of a small chamber where gas can enter through a semi permeable membrane (which blocks dust and IR radiation from outside). Depending on the concentration of the target gas, the amount of IR emission of a particular wavelength is absorbed within the optical path, and using the measurement from the IR detector can be used to determine the gas concentration. Most NDIR sensors also have an optical filter to allow only a small range of wavelengths to reach the IR detector so as to make it specific for the gas that absorbs that wavelength.

Other disclosures, such as US2008/0239322 by Hodgkinson et. al., U.S. Pat. No. 7,244,939 by Stuttard et. al, US2008/0308733 by Doncaster et. al., and U.S. Pat. No. 7,541,587 by Cutler et. al. describe similar devices.

In almost every case, the IR emitter and detector are two different components but packaged together. An exception is U.S. Pat. No. 5,834,777 by Wong, where both the emitter and detector are on the same chip with an optical path made of a waveguide by attaching (bonding) a second chip to the first chip. The process or the wafers are not CMOS, and only the waveguide is on a permeable membrane while both the emitter and the detector are outside the membrane. This will lead to high power consumption and lower maximum temperature of operation. Moreover, the optical path is relatively small for the IR emission to travel, and so the sensor has a lower sensitivity.

STATEMENT OF THE INVENTION

According to one aspect of the present invention, there is provided an Infra-Red (IR) detector comprising a thermopile. The thermopile comprises a plurality of thermocouples connected in series on a dielectric membrane fabricated in a CMOS Silicon on Insulator (SOI) process. Each thermocouple comprises at least first and second dissimilar materials in which the first material is made of a single crystal silicon layer. The single crystal silicon layer is a standard layer used in the CMOS SOI process.

According to a further aspect of the present invention, there is provided a method of manufacturing an Infra-Red (IR) detector using a CMOS Silicon on Insulator (SOI) process. The method comprises forming a substrate, forming a dielectric membrane on the substrate, and forming a thermopile comprising a plurality of thermocouples connected together on the dielectric membrane. Each thermocouple comprises at least first and second dissimilar materials in which the first material is made of a single crystal silicon layer. The single crystal silicon layer is a standard layer in the CMOS SOI process.

Embodiments of the present invention seek to improve on the state of the art devices by proposing a device made of a thermopile which comprises at least one layer made of single crystal (mono-crystalline) silicon using a CMOS process. The largest section of the thermopile body is placed on a membrane formed by removing the silicon substrate underneath using preferably Deep Reactive Ion Etching (DRIE). By using single crystal silicon in at least one of its layers, the device has the advantage of having low noise in the measured signal and good reproducibility in terms of geometrical dimensions and physical properties such as doping concentration, electrical resistance, thermal coefficients. The Seebeck coefficients of an n type doped or p type doped monocrystalline silicon layer are relatively high compared to other materials, such as aluminium (Al) or polysilicon. Moreover, the Seebeck coefficients of the n type doped or p type doped mono-crystalline silicon layer are opposite in sign enhancing the signal. Additionally, by controlling the doping level in the Silicon, one can increase the Seebeck coefficient in either the n or the p type silicon layers. Thermopiles are relative temperature sensors and they need an absolute temperature to compensate for the ambient temperature changes.

According to one embodiment, there is provided an additional temperature sensor outside of the membrane, integrated on the same chip with the thermopile. The device can also consist of an array of devices to improve sensitivity, or an array of thermopiles placed on smaller membranes to improve the overall reliability of the device. This is made possible through the use of DRIE which allows membranes to be packed together much more close than those fabricated by using wet-etching methods (such as KOH or TMAH based).

Thermopile IR detectors that are made of single crystal silicon but not fabricated in CMOS technology or using a CMOS core do not allow an accurate temperature sensor or any circuitry to be integrated on the chip. On the other hand State-of-the art IR detectors made using CMOS technology involve polysilicon, and not single crystal silicon.

According to one embodiment, there is provided a thermopile fabricated using Silicon on Insulator (SOI)-CMOS process. The process starts with an SOI wafer which is then processed using a standard commercial CMOS process. The thermopile may be formed using this process consisting of several thermocouples connected together in series, with at least one layer of the thermocouple being made of n type or p-type mono-crystalline silicon. The SOI-CMOS processing step is followed by a back etching step to form the membrane. This step can be either dry etching by DRIE or wet anisotropic etching such as KOH or TMAH. The DRIE method has the advantage that it creates vertical walls rather than angled walls. This results in less loss of chip area at the edge of the membrane and better reproducibility of the membrane, as the membrane size is virtually independent for small variations of the substrate thickness. Furthermore, if more membranes are desirable, right angled walls allow packing them more closely together.

Each thermocouple consists of two dissimilar materials in strips, with one end outside the membrane and one inside—with the ends inside forming a thermal junction (called the hot junction), while the two ends outside the membrane form a second thermal junction (called the cold junction). To enhance the signal adjacent thermocouples are connected in series to form a thermopile.

According to one embodiment, at least one material of the thermopile is formed from the thin SOI layer (i.e. monocrystalline silicon layer placed above the buried oxide) and is either a single crystal Silicon P+ or a single crystal Silicon N+ material. The second material can be any one of polysilicon, single crystal Silicon N+ or single crystal Silicon P+ (respectively), and a CMOS metal such as Aluminium, Copper, Tungsten or Titanium. Preferably, one layer of the thermopile is made of an n-type mono-crystalline material while the other is made of an p-type mono-crystalline material.

Optionally, the Silicon N+ layer and/or the Silicon P+ layer are made within the same CMOS process step (and the same photolithographic mask) with the Silicon N+ layer and/or the Silicon P+ layer of the N-Channel MOSFETs and P-Channel MOSFETs, respectively.

An absolute temperature sensor may also be fabricated on the same chip outside the membrane area. This temperature sensor can be a thermodiode, a thermotransistor, a resistive temperature sensor, a Vptat or Iptat or another temperature sensor available in CMOS. The thermodiode or thermotransistors or circuits based on these are preferable, as the process control of active elements in CMOS such as diodes and transistors is better than that of passive elements such as resistors.

The thermodiode can be made of a semiconductor junction comprising the said Silicon N+ layer and the P+ Silicon layer (made within the same CMOS process step and the same photolithographic mask with the Silicon N+ layer and/or the Silicon P+ layer of the N-Channel MOSFETs and P-Channel MOSFETs respectively). Alternately, the diode may also consist of silicon P-well and N-well regions.

The thermotransistor could be an npn or a pnp bipolar transistor with one of the junctions electrically shorted so that the device behaves in a similar way to a thermodiode.

IPTAT and VPTAT are accurate temperature circuits based on thermotransistors or thermodiodes, where the former gives an output current linearly proportional with temperature while the latter gives an output voltage linearly proportional with temperature.

The membrane can be either circular or rectangular shaped or can have any other suitable shape. The thermopile can consist of several thermocouples extending from the outside of the membrane to the inside and repeated in a circular manner. Alternately it can consist of two rows of thermocouples. It can also consist of thermocouples extending to the very centre of the membrane from four sides and then additional thermocouples formed closely to these, but with the hot junction moving slightly away from the centre as the space in the centre is filled. The thermocouples may extend all the way to the centre of the membrane or only partway into the membrane. Many other arrangements of thermocouples on the membrane are possible.

The membrane may also have more than one type of thermocouples. For example, it may consist of a series of single crystal silicon P+ and N+ thermocouples and also a series of polysilicon with metal thermocouples. Such a structure having thermocouples connected together in series can provide a higher output signal.

The membrane may also have extra structures, such as a metal, polysilicon or single crystal silicon plates. The membrane can also have an additional absolute temperature sensor such as a resistor, a thermodiode or a thermotransistor within the same membrane as the thermopile. A heater may also be embedded on the same membrane as the thermopile. This allows the membrane to be maintained at a steady temperature to remove temperature fluctuations in the thermopile signal.

The membrane may also have an IR absorbing material on top. This coating can be of any type, such as carefully controlled layers of silicon oxide, silicon nitride or polymers (e.g. polyimide). Alternatively, materials such as carbon black, carbon nanotubes, metal oxides or graphene can be grown or deposited on the micro-hotplate. These materials have high absorption and therefore improve the amount of IR emitted. Other materials having high absorption can also be used.

In one embodiment, the thermopile consists of single crystal silicon P- (or P-well) and single crystal silicon N- (or N-well) materials—both of which have polysilicon layer gates above them. Appropriate bias voltages are applied to the polysilicon gates above these regions resulting in inversion layers in the single crystal silicon P- and N- (or P-well and N-Well) regions respectively. According to one embodiment of this invention, it is these inversion layers created under the polysilicon gates that form one or both of the dissimilar materials in strips of the thermocouple.

In one embodiment, the thermopile consists of single crystal silicon P+ and single crystal silicon N+ regions with polysilicon between them to allow self-aligned formation of these regions—allowing them to be packed together more closely. This is advantageous because this arrangement increases the sensitivity and/or decreases the output resistance of the thermopile per membrane area.

In one embodiment, the IR detector consists of an array of several membranes etched by DRIE, packed together closely, each with its own thermopile. This improves the overall sensitivity of the device. Another use of the array is to have an array of smaller membranes instead of one large membrane. A large membrane is mechanically less stable and has a longer thermal response time compared to a small membrane, but a small membrane device will have lower sensitivity. By using an array of small membranes, with thermopiles placed on each membrane mounted in series, the mechanical stability and thermal response time of the entire device, comprising multiple thermopiles on multiple small membranes can be significantly improved. The use of DRIE to etch the small membranes means that the membranes can be packed very close together and very little extra space on the chip is required when compared to the space taken by a single large membrane. Preferably the thermopiles on each membrane can be connected together in series to increase the overall signal, but there may be applications where they can be measured separately, or indeed connected in parallel to reduce the output resistance. The packaging can also be designed so that there is a different IR filter above each membrane in the array—so that each membrane senses a different IR wavelength.

In one embodiment, an IR filter is combined with the IR detector. This is by using back etching to form a thin membrane consisting of silicon dioxide and/or silicon nitride on a silicon or SOI chip or wafer. This membrane can act as an IR filter. This chip/wafer is then combined with the IR source by the use of wafer bonding. The composition of the membrane acting as the filter can be changed and other materials can be deposited on the membrane to change the filtering properties as desired.

This method can be combined with arrays by using an array of filters wafer bonded onto an array of IR detectors. Each filter can have either the same properties, or different properties to allow a different spectrum of wavelengths.

Alternatively the filter can be made by etching selectively the CMOS metal layers above the silicon in a mesh shape or in dots shape. The mesh size or the size of the dots and the distance between the dots is adjusted to filter the desired signal at particular wavelengths and/or to increase the signal at particular wavelengths. The sensitivity could also be increased by increasing the signal to noise ratio at a particular wavelength. The etching of the metal layers above the silicon is done in the CMOS sequence, and therefore does not come with additional cost.

An embodiment includes the packaging of the IR detectors. Any standard packaging such as TO-5, TO-39 or TO-46 can be used or the chip can be packaged directly onto a PCB board, however the lids should be open to have a cavity to allow the IR radiation to pass. The packaging may also include a filter or an IR transparent window in addition to, or in place of, the filter wafer-bonded to the IR source or that made of the CMOS metal layer. It can also be packaged directly in an NDIR chamber.

The use of SOI process also means that drive, read-out and signal processing circuitry can be integrated with the IR detector on the same chip. The signal processing circuit could be a simple voltage follower circuit, an amplifier or filters. More complex circuits could modify the shape of the analogue signal to suit an application or could include analogue to digital transducers. A drive and read out circuitry for the on-chip temperature sensor can also be monolithically integrated.

In one embodiment, an IR source is integrated on the same chip with the IR detector, to use the chip in an NDIR (Non Dispersive Infra-Red) gas sensor. The IR source can be a micro-hotplate device—a micro-heater on a membrane. The micro-heater can be a resistive heater made from single crystal silicon, polysilicon or from a CMOS metal such as aluminium, copper, tungsten or titanium.

To improve the performance, the IR source may also have a material with high emissivity such as carbon nanotubes, carbon black, graphene, polyimide, a polymer, metal films, metal blacks, thin film stacks or other materials with high IR emissivity deposited or grown on the top of the membrane.

Alternatively the IR emissivity in the integrated IR source can be increased by etching selectively the CMOS metal layers above the silicon in a mesh shape or in a dot shape. The mesh size or the size of the dots and the distance of the dots is adjusted to increase the optical power at a particular wavelength and/or to filter out signal at other wavelengths. The etching of the metal layers above the silicon is done in the CMOS sequence, and therefore does not come with additional cost.

The chip may be packaged to be used as a miniaturised NDIR sensor within a package such that there is a partition between the two devices and the IR emission cannot travel directly from the source to the detector. Instead, the IR emission has to travel a much longer path to reach the source via an IR filter. This is achieved during both chip and package design. When designing the chip, the dielectric oxide between the emitter and detector is filled with vias and metal layers to block the transmission of IR within the dielectric oxide. After this a partition is formed above the chip which can be done during packaging, or earlier by wafer bonding with a patterned substrate on top. Complex circuitry can be integrated on the chip for drive, read-out and signal processing of both the IR source and detector on the chip.

The packaging to form such a sensor can be of different types. One embodiment of the invention is to package the chip in a cylindrical package with walls made from a reflective surface with a filled centre, so that the IR radiation travels in a circular path (reflecting from the package walls) from the emitter to the detector part of the chip. The optical path also has an optical filter to allow only the wavelength of interest to reach the IR detector. The package is covered with a particle filter to prevent air borne particles from coming in the optical path.

In one embodiment, the package may be rectangular with the chip on one side, and a reflective surface on the far side of the package allows reflected IR to travel from the source to the detector.

BRIEF DESCRIPTION OF THE DRAWINGS

In order that the invention may be more fully understood, a number of embodiments of the invention will now be described, by way of example, with reference to the accompanying drawings, in which.

DETAILED DESCRIPTION OF THE PREFERRED EMBODIMENTS

Figure 1:
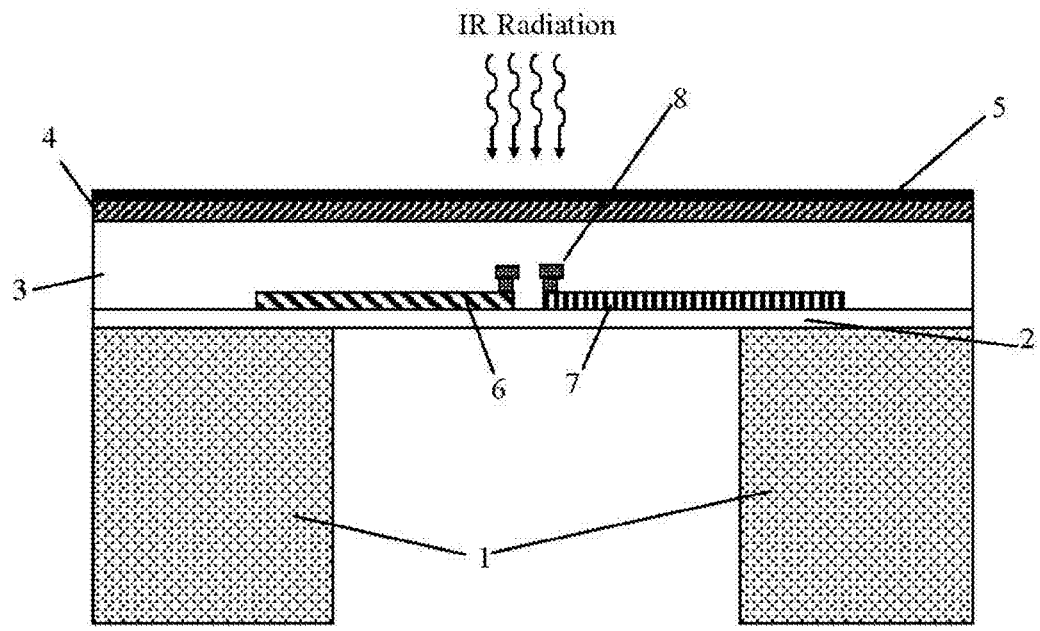
FIGS. 1 and 2 are schematic cross-sections of different designs of an SOI IR detector.

FIG. 1 shows a schematic cross section of an IR detector made in SOI process. There is provided a membrane layer 2,3,4 which is supported on a silicon substrate 1. The membrane layer includes a buried oxide layer 2, dielectric layers 3 and a passivation layer 4. A thermopile is formed within the membrane layer consisting of several thermocouples connected together in series. FIG. 1 also shows the thermopile using single crystal silicon N+ 6 and single crystal silicon P+ 7 materials. The terminals of the thermopile where the electrical signal is generated are identified as 6a and 7a. These terminals could connect to pads (not shown) or to other read-out or signal processing circuits (not shown). A CMOS metal 8 is used to electrically connect the P+ and N+ layers in hot and cold thermal junctions. A metal layer (made within the CMOS process) is used to connect them to avoid a semiconductor P/N junction forming. A material with high IR absorption is grown or deposited on the top of the membrane.

The entire device is manufactured by using a commercial CMOS SOI process. Preferably, the membrane layer is formed in this case by the use of back etching using deep reactive ion etching (DRIE) technique. The micro-hotplate can be fabricated with or without drive read-out or signal processing circuitry on the same chip.

Figure 2:
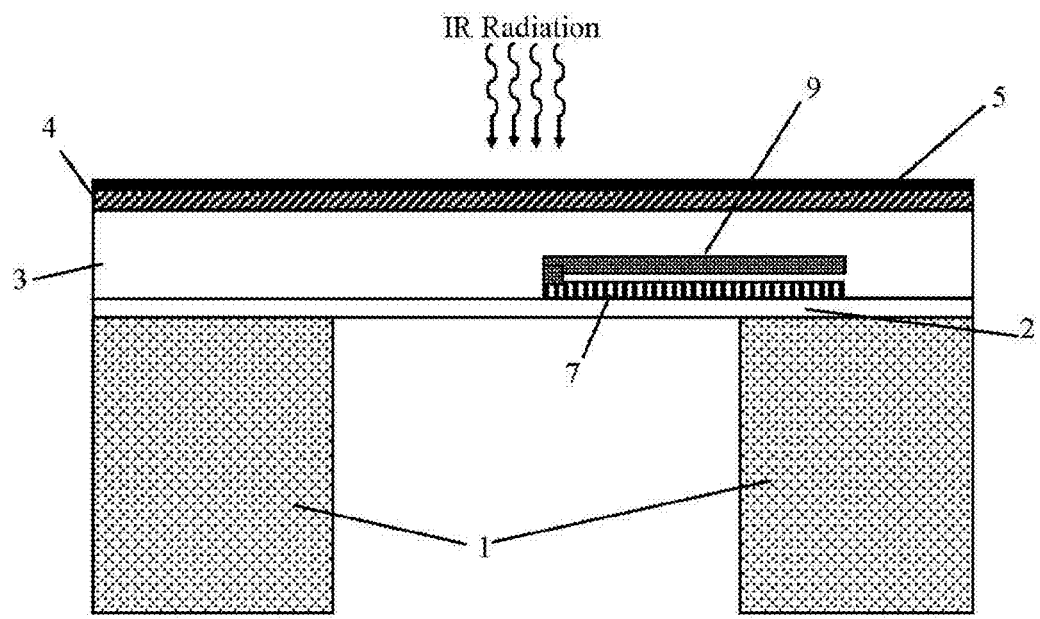

FIG. 2 shows an alternative cross-section of an IR detector. Many features of FIG. 2 are the same as those in FIG. 1, except that the materials (in FIG. 2) used for the thermopile are single crystal silicon P+ and a CMOS metal 9.

It should be noted that FIGS. 1 and 2 give two possible material configurations for the thermopile only as examples. Many different configurations can be used as well. For example, a polysilicon with either p or n doped single crystal silicon. Alternatively, a stacked thermopile with three or more materials is possible.

Figure 3:
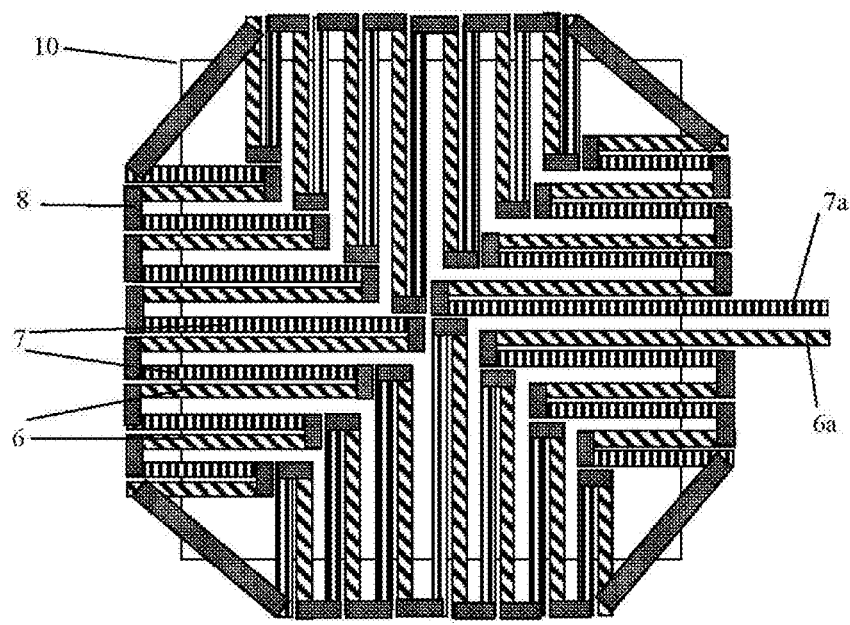
FIGS. 3-8 are plan views of IR detectors with different layouts of the thermocouples and membrane shapes and other structures on the membrane.

FIG. 3 shows a plan view of an IR detector on a rectangular membrane 10. The thermocouples are arranged so that the middle thermocouples go all the way to the centre of the membrane, while the subsequent thermocouples are further away from the centre as space in the centre fills up. The thermocouples consist of single crystal P+ silicon 6 and single crystal N+ silicon 7. 6a (single crystal N+ silicon), and 7a (single crystal P+ silicon), form the two end terminals of the thermopile.

Figure 4:
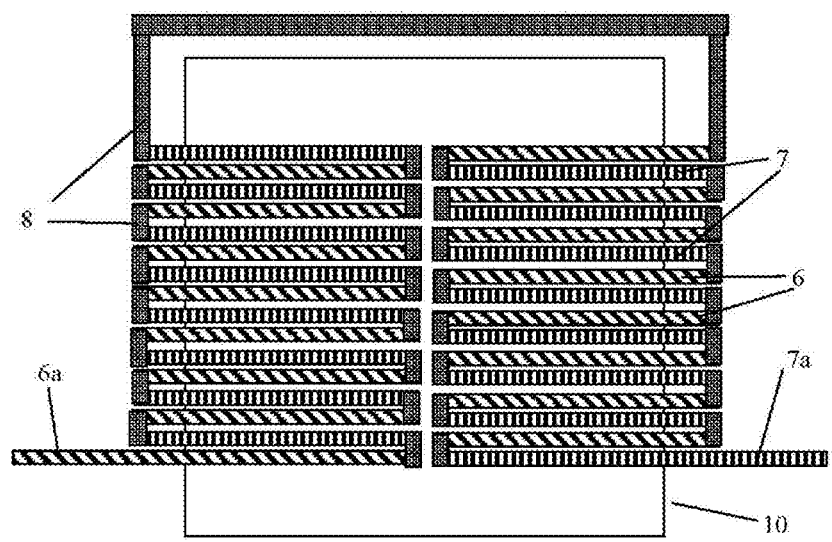

FIG. 4 shows a plan view of a thermopile based IR detector on a rectangular membrane consisting of single crystal silicon P+ and single crystal silicon N+ with the thermocouples arranged in two columns.

Figure 5:
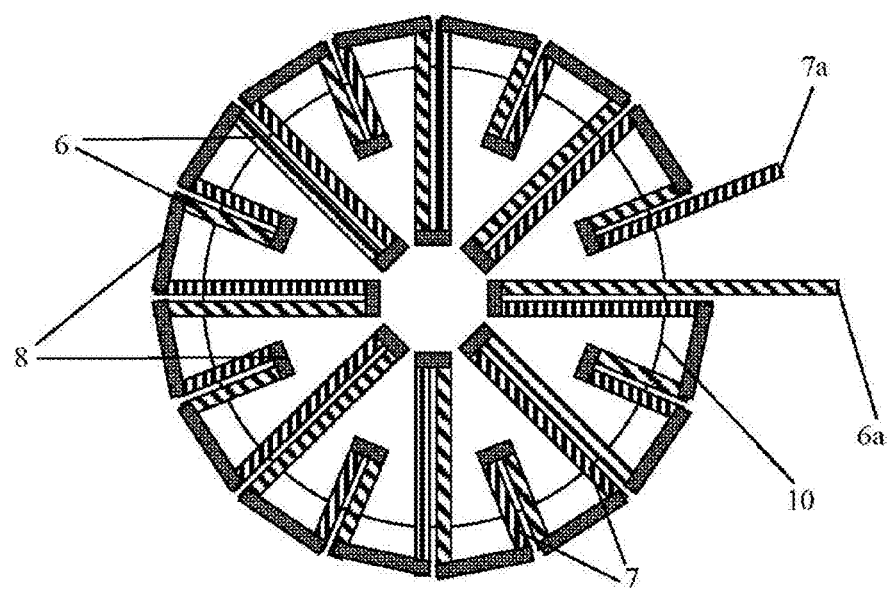

FIG. 5 shows a plan view of the IR detector on a circular membrane. In this embodiment, some thermocouples extend to near the centre of the membranes, while others do not as the space in the centre is already filled.

Figure 6:
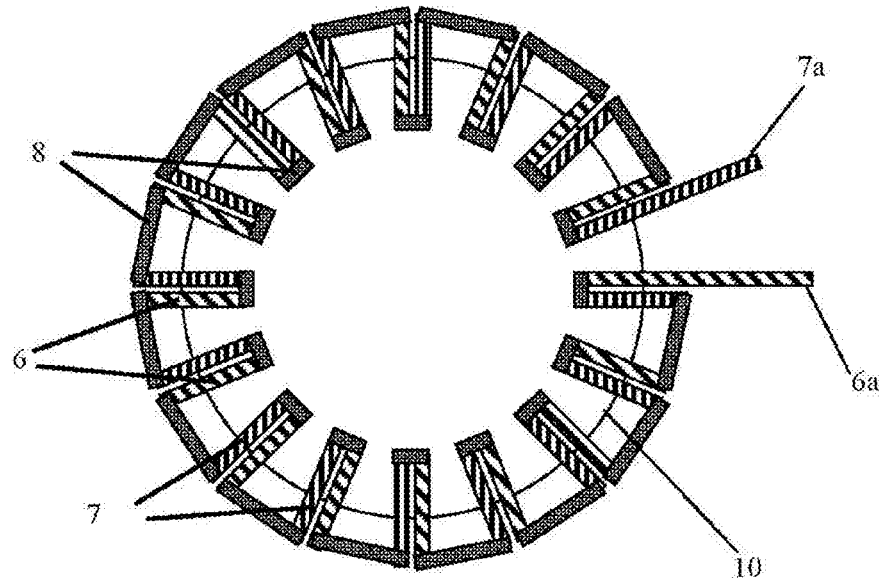

FIG. 6 shows a plan view of the IR detector where none of the thermocouples extend to the centre. The reasoning for this is that the temperature gradient is higher at the edges (assuming a uniform incident radiation). In this way the internal resistance of the thermopile is significantly reduced while the sensitivity of the thermopile is not reduced to the same extent. This and the previous examples are shown as some possible arrangements of the thermocouples. It should be evident that many such configurations are possible.

Figure 7:
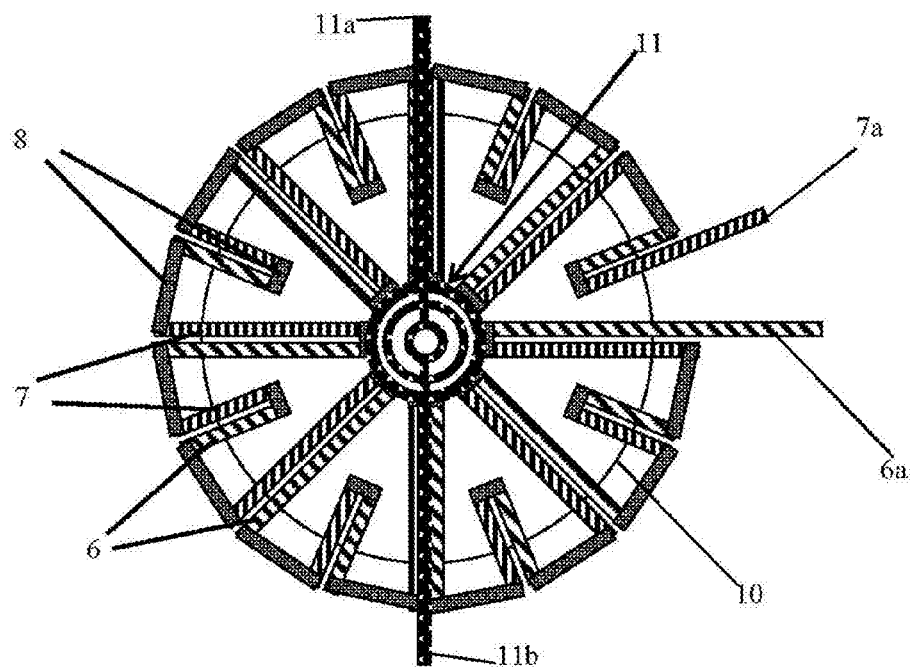

FIG. 7 shows a plan view of an IR detector with a heater 11 on the same membrane. The heater may be a simple resistance with two terminals 11a and 11b and made of one of the metal layers available in the CMOS SOI process. Optionally the heater may also be made from polysilicon or single crystal silicon, in which case the thermopile may have to be arranged and designed so as to allow space for the heater.

Figure 8:
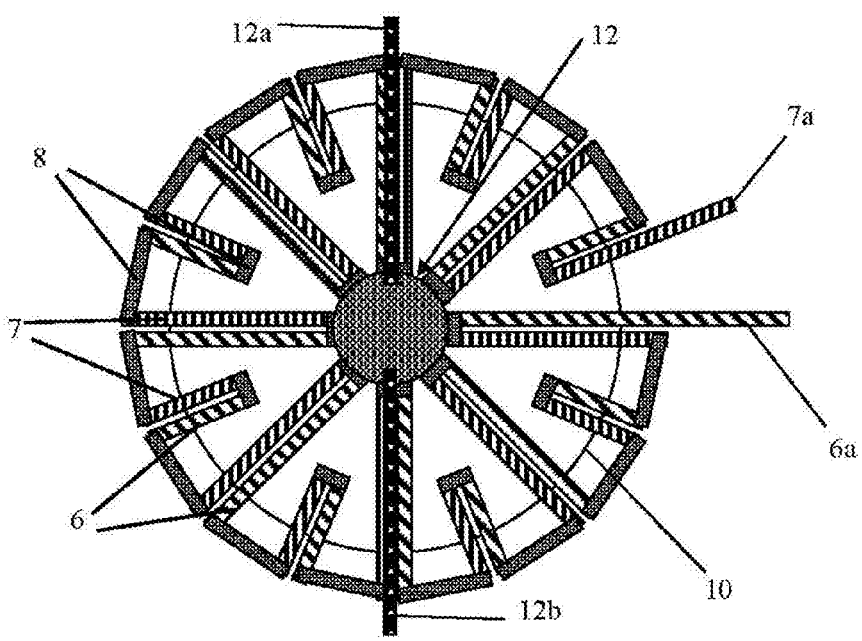

FIG. 8 shows a plan view of an IR detector with a temperature sensor 12 on the same membrane. The temperature sensor may be a diode or a resistor with two terminals 12a and 12b. The diode may comprise (not shown) an N+ layer/P+ layer semiconductor junction where at least one of these layers is also used for defining the thermocouples (i.e. 6 or 7).

Figure 9:
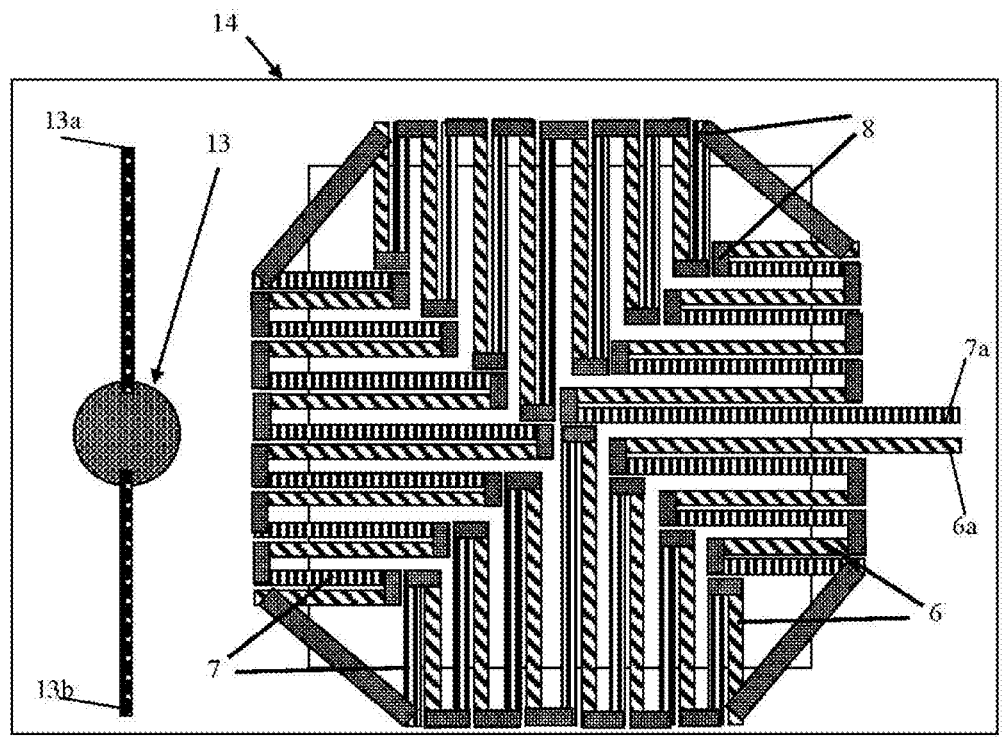
FIG. 9 is a plan view of a micro-chip consisting of both an IR detector and temperature sensor.

FIG. 9 shows a plan view of a thermopile IR detector and a temperature sensor 13 (connected by tracks 13a and 13b) on the same chip 14. The temperature sensor is made at the same time as the IR detector using the same material layers that are using in the standard SOI process. This temperature sensor can be a diode, a resistor or a temperature sensing circuit such as VPTAT or IPTAT. Such a sensor is fabricated using existing layers in the CMOS process. For example, a diode could contain the same N+ and P+ layers that could be used in the thermopile according to this invention.

Figure 10:
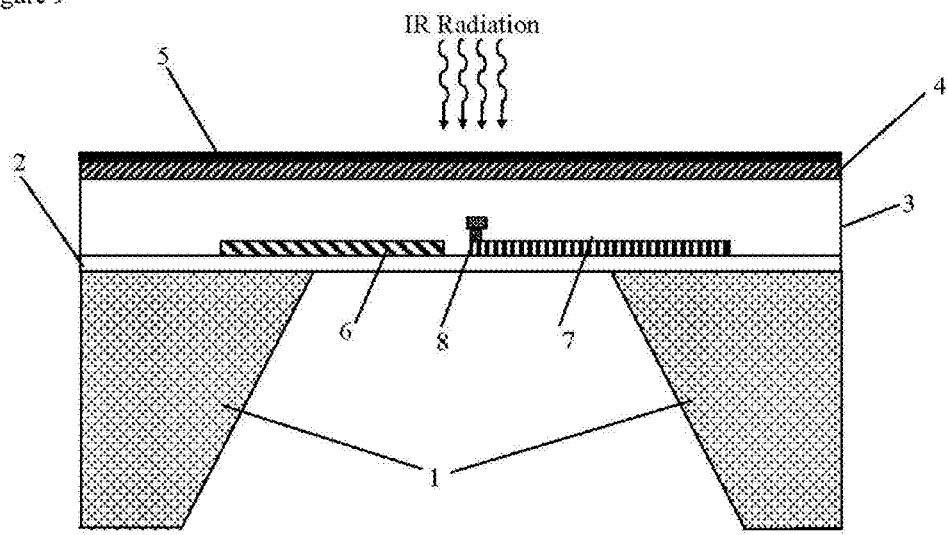
FIG. 10 shows a schematic cross-section of an IR detector fabricated by anisotropic wet etching.

FIG. 10 shows a cross-section of an IR detector where the membrane 2, 3, 4 has been formed by wet etching, optionally by an anisotropic KOH or TMAH back-etch.

Figure 11:
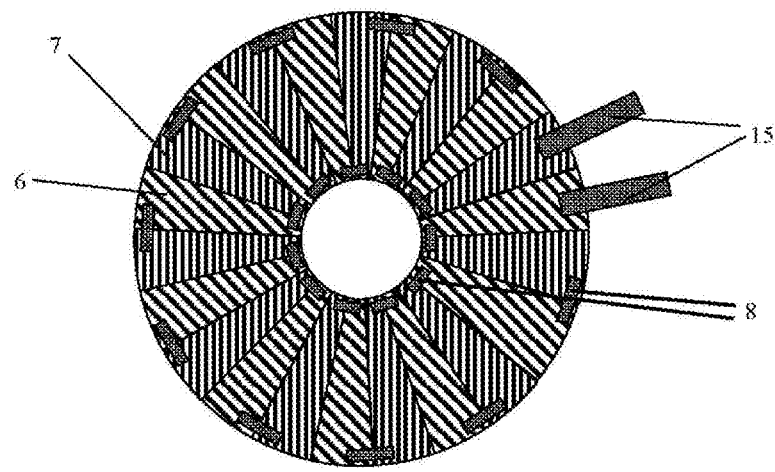
FIG. 11 shows a plan zoomed view of the thermocouples based on single crystal silicon P+ and N+ where there is no spacing between them.

FIG. 11 shows a plan view of the thermocouples in a thermopile consisting of single crystal silicon P+ and single crystal silicon N+ material. In this particular embodiment, there is no spacing between the P+ and N+ layers. Electrical conductance is avoided due to the semiconductor PN junction formed between the two materials. At the hot and cold junctions, a metal 8 is used to connect the materials at that point. Metal connections 15 are used to measure the output voltage on the thermopile.

Figure 12:
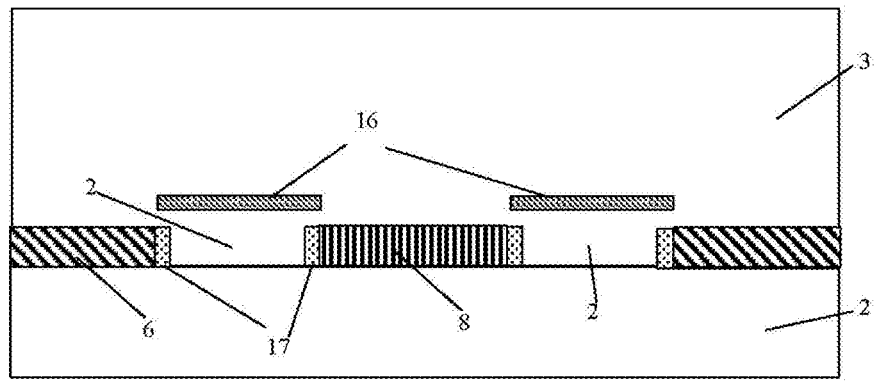
FIGS. 12 and 13 show zoomed in schematic cross-sections of the thermocouples based on single crystal silicon P+ and single crystal silicon N+ with a polysilicon layer used to self align these regions.

FIG. 12 shows a cross-section of the thermocouples in a thermopile within part of the membrane consisting of single crystal silicon P+ and single crystal silicon N+ material. In this particular embodiment, the polysilicon layer 16 is used to allow self-aligned fabrication of the P+ and N+ regions. Using this method, a closer packing of the thermocouples within the membrane is accomplished. The silicon area 17 falling below the polysilicon remains at a low doping level.

Figure 13:
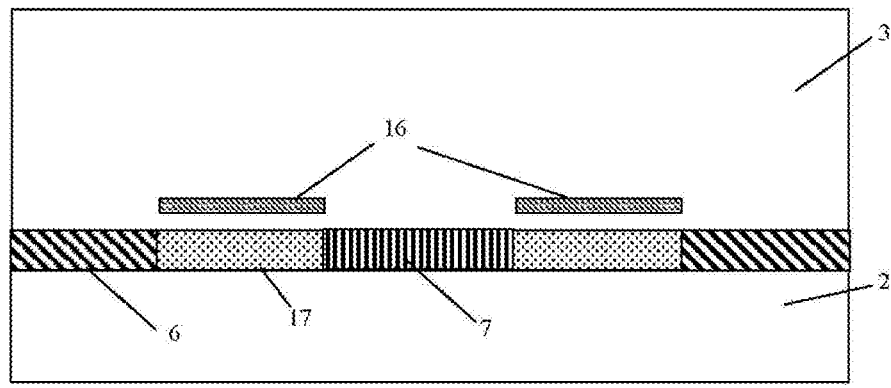

FIG. 13 shows a cross-section of the thermocouples consisting of single crystal silicon P+ 7 and single crystal silicon N+ material 6. In this case, the polysilicon layer 16 is also used for self aligning, and also a layer of silicon 17 remains even below the polysilicon—and can be any of a Nwell, Pwell, Ndrift and Pdrift. This layer 17 has a very high resistance and so has minimal effect of conducting between the N+ and P+ regions. The silicon area 17 falling below the polysilicon remains at a low doping level.

Figure 14:
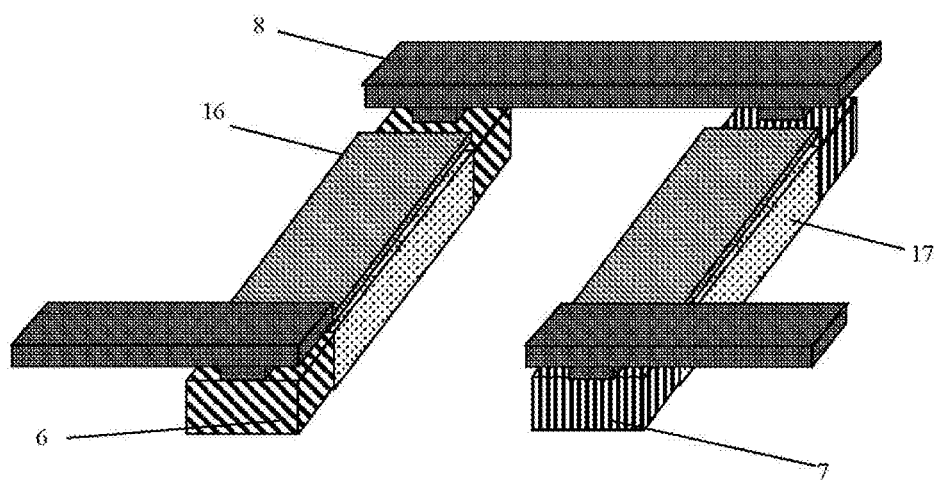
FIG. 14 shows a zoomed in view of a thermocouple where the materials are inversion layers created by N-MOSFET and P-MOSFET.

FIG. 14 shows a zoomed in view of a thermocouple within the membrane where the materials in the strips of the thermocouples are the inversion layers created by n and p type MOSFETs. The base strips are lowly doped p and n type single crystal silicon. The ends on one strip are highly doped N+ silicon, while the other has highly doped P+ silicon at the ends. A polysilicon layer 16 acts as the gate of the MOSFETs and when appropriately biased, it provides a highly doped inversion layer at the surface of the underlying silicon.

Figure 15:
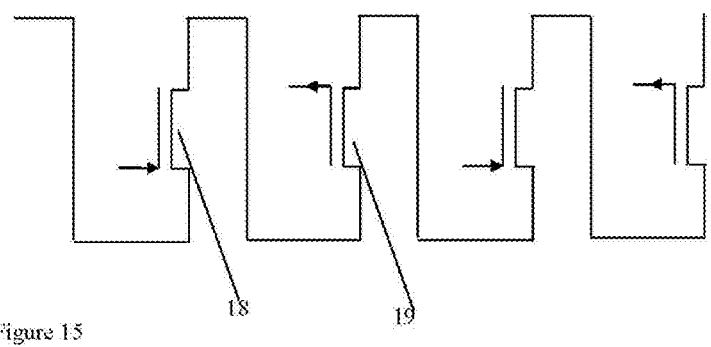
FIG. 15 shows part of a schematic circuit diagram consisting of the thermopile consisting of N and P-MOSFETs.

FIG. 15 shows a schematic circuit diagram of the thermopile design where inversion layers created by the n and p type MOSFETs are used. The design essentially consists of several alternating n type MOSFETs 18 and p type MOSFETs 19 connected together.

Figure 16:
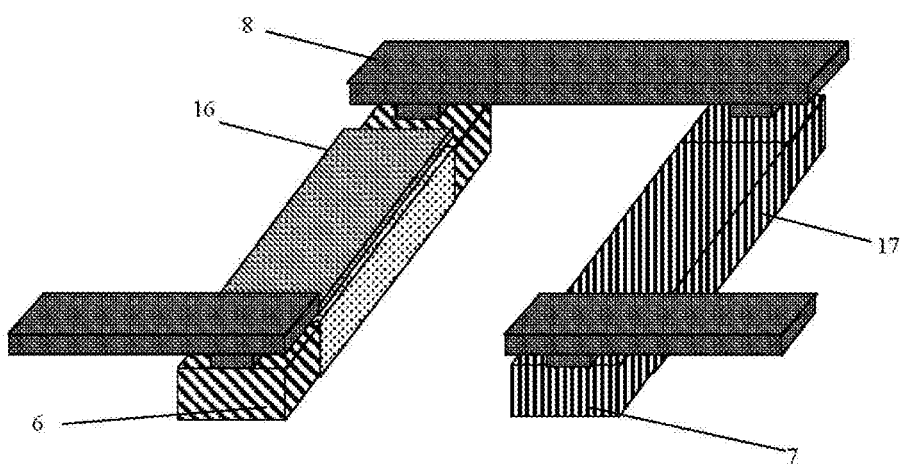
FIG. 16 shows a zoomed in view of a thermocouple where one material is an inversion layer created by an N-MOSFET, while the other material is single crystal P doped silicon.

FIG. 16 shows a zoomed in view of a thermocouple where one material is the inversion layer created by n type MOSFET, while the other is single crystal silicon P+ layer. It should be noted that the design can also be swapped to have a p-type MOSFET and a single crystal silicon N+ structure.

Figure 17:
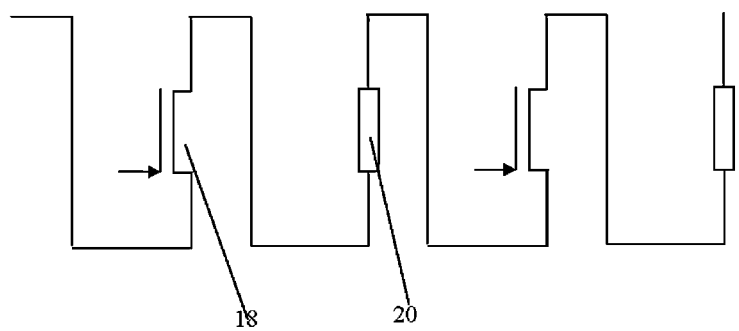
FIG. 17 shows a part of a schematic circuit diagram consisting of the thermopile where one material is an inversion layer created by an N-MOSFET and the other material is single crystal P doped silicon.

FIG. 17 shows a schematic circuit diagram of the thermopile design where inversion layer created by the n type MOSFETs is used along with single crystal P+ silicon 20. The design essentially includes several alternating n type MOSFET and single crystal P+ silicon connected together.

Figure 18:
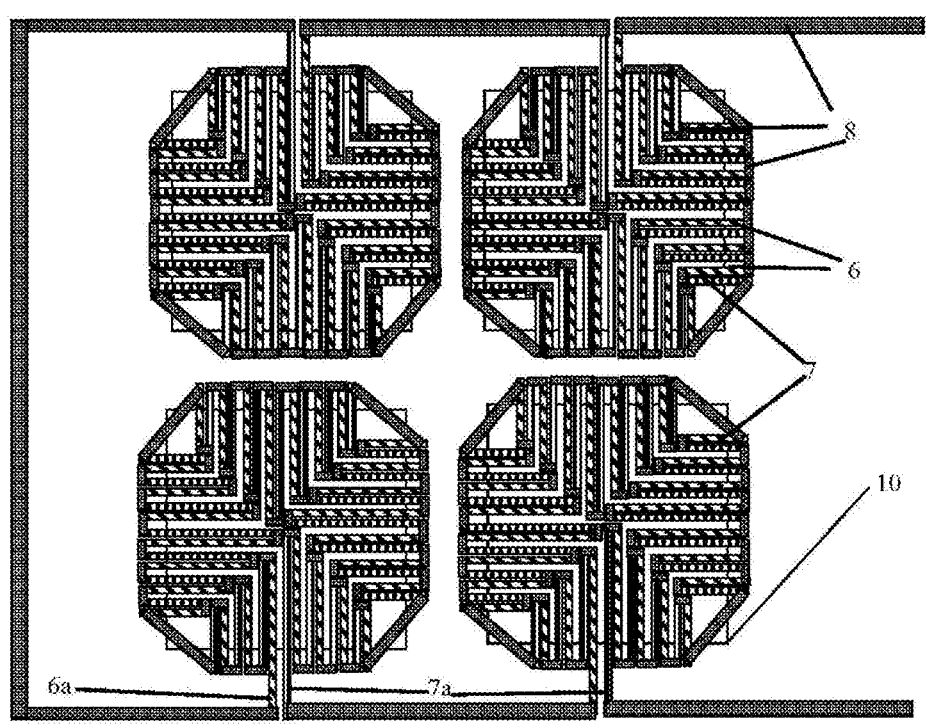
FIG. 18 shows a plan view of an array of IR detectors connected together in series.

FIG. 18 shows a plan view of an array of membranes to be used as an IR detector. The thermopiles are each connected in series. Such a design has greater sensitivity than a single membrane.

Figure 19:
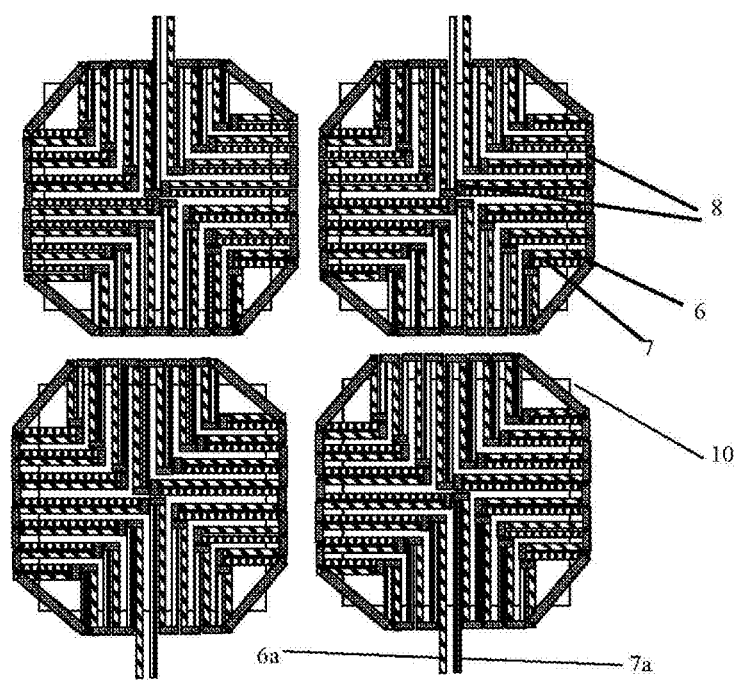
FIG. 19 shows a plan view of an array of IR detectors which can be measured individually.

FIG. 19 shows a plan view of an array of membranes to be used as an IR detector. The thermopiles are not connected and so can be measured separately. For example, they can be connected in parallel to give a smaller output resistance. In this particular example, all the IR detectors in the array are identical, however, they can also be different, having different layout arrangements, different materials for the thermocouples or different membrane sizes or shapes.

Figure 20:
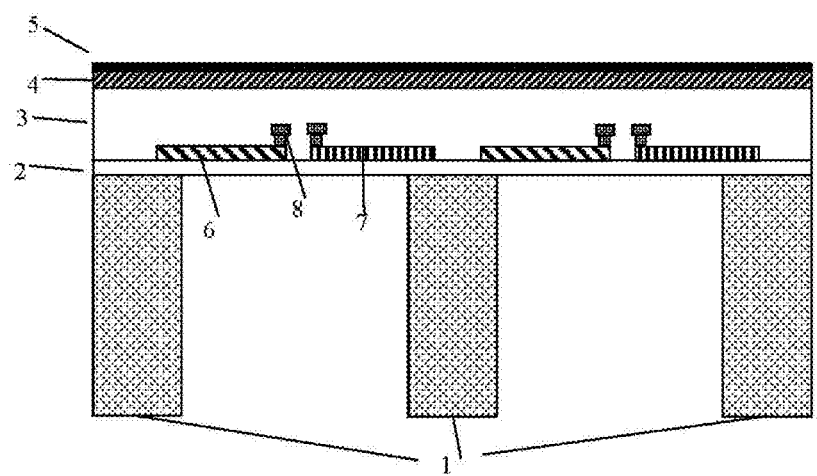
FIG. 20 shows a schematic cross-section of an array of IR detectors.

FIG. 20 shows a schematic cross-section of two of the IR detector membranes of an array close to each other. The near vertical sidewalls obtained due to DRIE etching allow close packing of the membranes.

Figure 21:
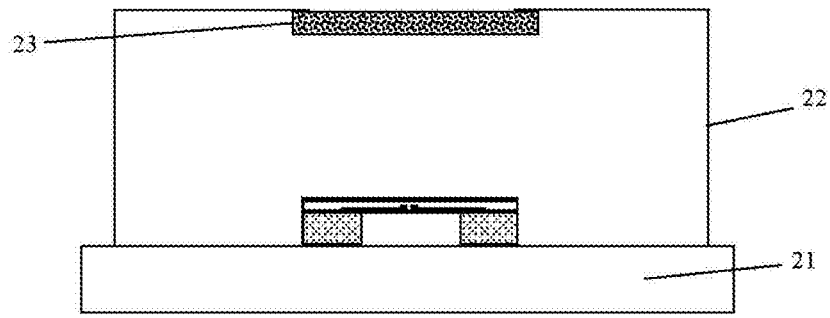
FIG. 21 shows a schematic cross-section of the chip packaged with an IR filter.

FIG. 21 shows a schematic cross-section of a packaged IR detector. The detector chip is placed on the package base 21, covered by the package lid 22. An IR filter 23 is placed to allow only the radiation of the desired frequency range to pass through. It should be noted that this is only one possible packaging option shown and other options among standard packages are also possible.

Figure 22:
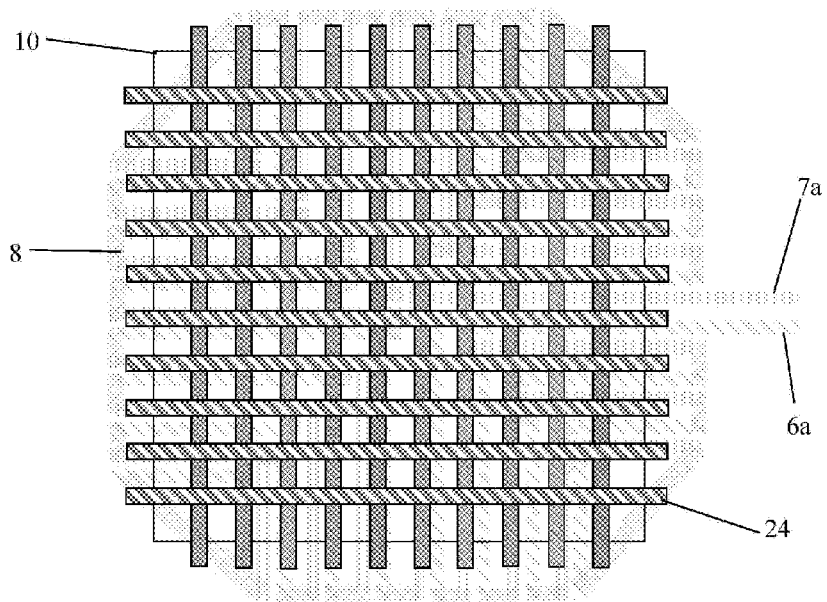
FIGS. 22 and 23 show plan views of an IR detector with a patterned top metal layer to improve absorption for a particular wavelength.

FIG. 22 shows a plan view of a thermopile based IR detector, with a top metal layer patterned 24 in the shape of a grid, which is used improve the absorption for a particular wavelength depending on the size and spacing of the holes.

Figure 23:
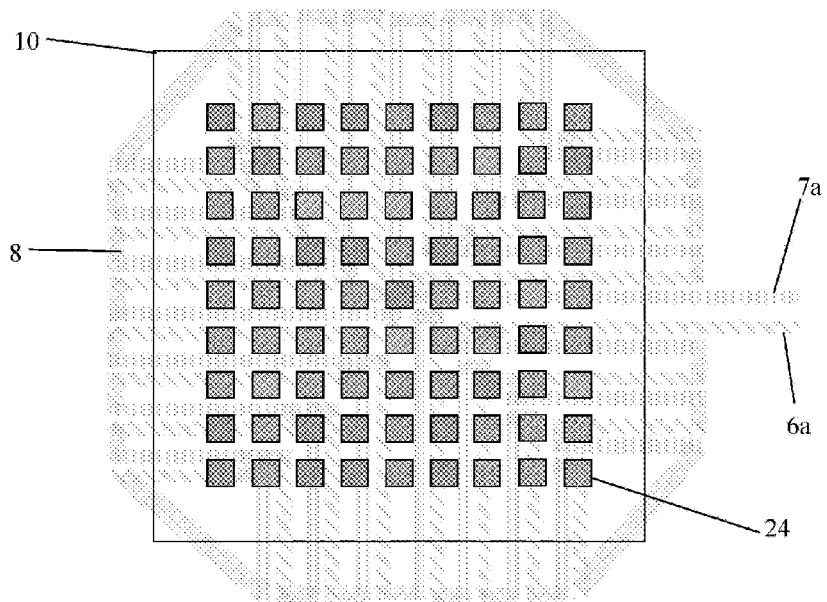

FIG. 23 shows a plan view of a thermopile based IR detector with a top metal layer patterned in the shape of dots, which is used improve the absorption for a particular wavelength, and also acting as a filter depending on the size and shaping of the dots. Both the grid and dot structures are made using the metal layer(s) already present in the CMOS process, so no additional steps are required.

Figure 24:
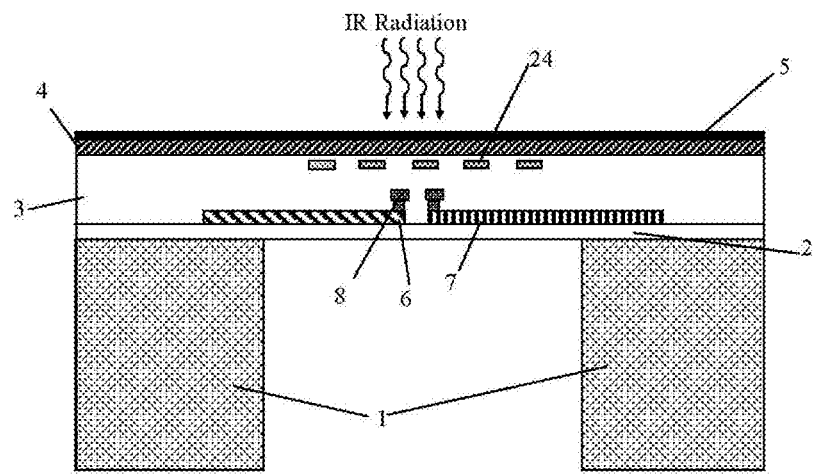
FIGS. 24 and 25 show cross-sections of an IR detector with one or two patterned top metal layers to improve absorption for a particular wavelength.

FIG. 24 shows a cross-section of an IR detector with the top metal 24 forming either a grid or an array of dots.

Figure 25:
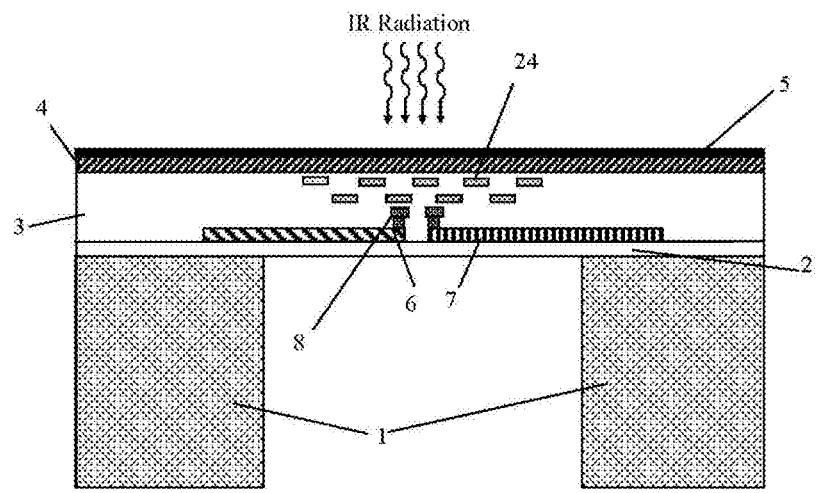

FIG. 25 shows a cross-section of two metal layers 24 forming a grid or an array of dots to improve absorption of a particular wavelength.

The drawings shown in FIGS. 22-25 for the patterned metal layer to improve absorption are given as examples, and it would be evident that other possible patterns and schemes can be used, such as a hexagonal or circular shape, for example.

Figure 26:
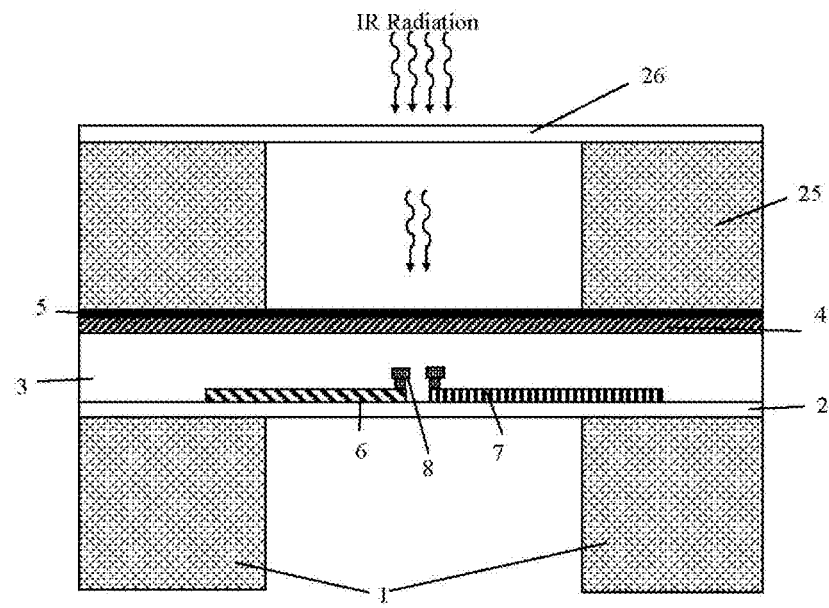
FIG. 26 shows a schematic cross-section of a chip with an IR detector with an IR filter wafer bonded to the chip.

FIG. 26 shows a schematic cross-section of an IR detector with a wafer-bonded IR filter. The chip/wafer bonded consists of a silicon substrate 25, and a membrane 26. The membrane may consist of silicon dioxide, silicon nitride and/or other materials to alter the filter properties as required.

Figure 27:
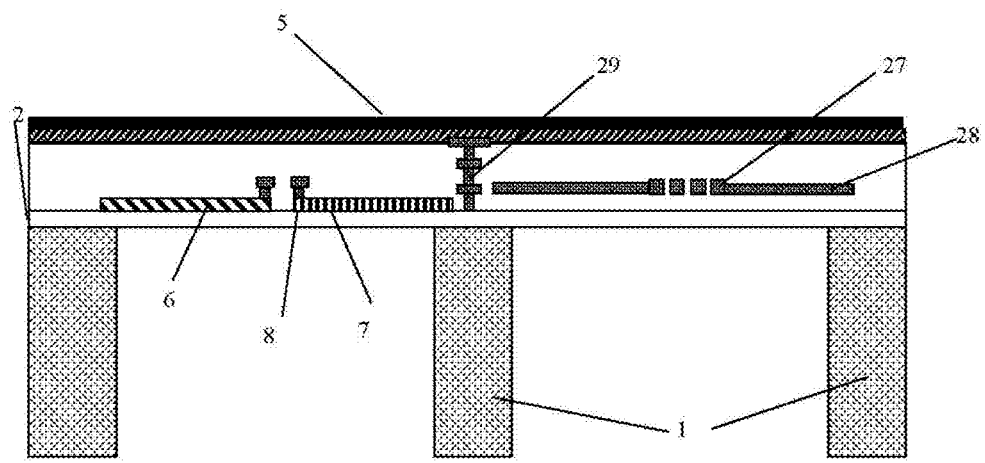
FIG. 27 shows a schematic cross-section of a chip with an IR source and an IR detector integrated on the same chip with partitions in between to prevent direct IR radiation between the two devices.

FIG. 27 shows a schematic cross-section of a chip with an IR detector and an IR source which is a micro-heater on a membrane. The micro-heater 27 is connected by tracks 28 and the membrane is used to improve the thermal isolation of the heater. The chip is designed so that the emission from the IR source does not go directly to the IR detector. This is achieved by creating an isolation between the two through a stack of metal layers and vias 29 which are formed by the CMOS process parameters and prevent IR from travelling via the inter-dielectric layers.

Figure 28:
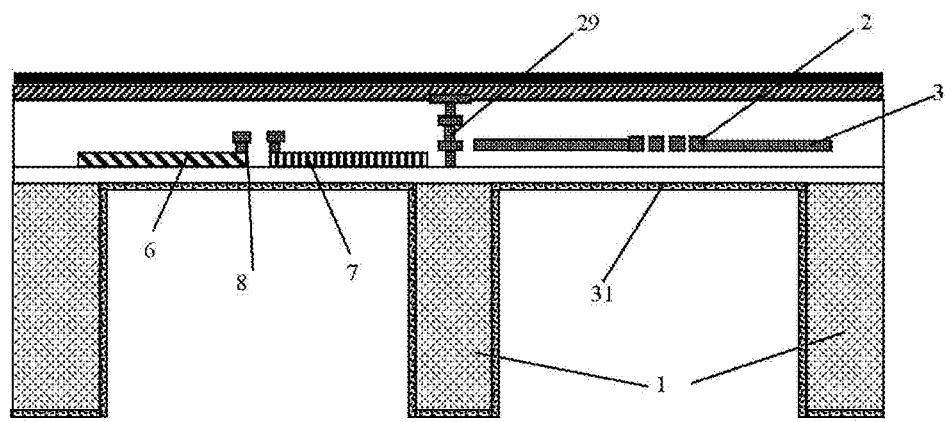
FIG. 28 shows a schematic cross-section of a chip with an IR source and an IR detector integrated on the same chip with partitions in between to prevent direct IR radiation between the two devices, as well as a thin back-side film that is opaque to IR radiation.

FIG. 28 shows a thin film coating 31 on the back of the chip. The coating is made of a material opaque to IR to prevent IR radiation travelling from the source to detector from the back side.

Figure 29:
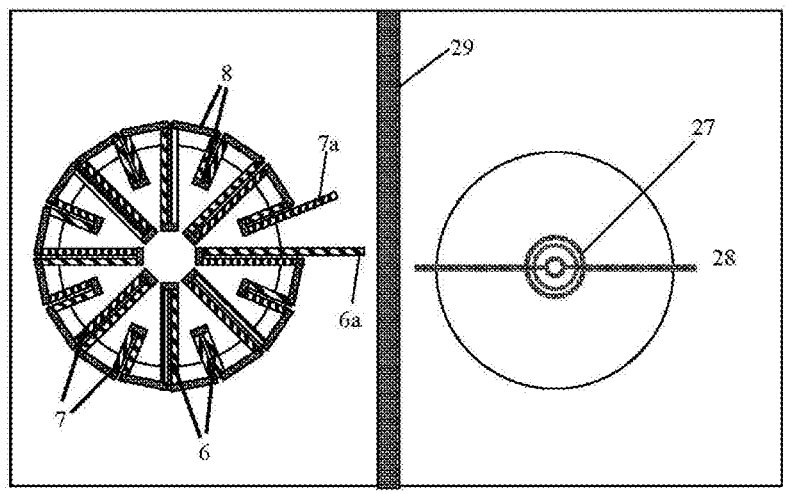
FIG. 29 shows a top view of a chip with an IR source and a thermopile IR detector integrated on the same chip.

FIG. 29 shows a top view of a chip with an IR source 28 and a thermopile IR detector.

Figure 30:
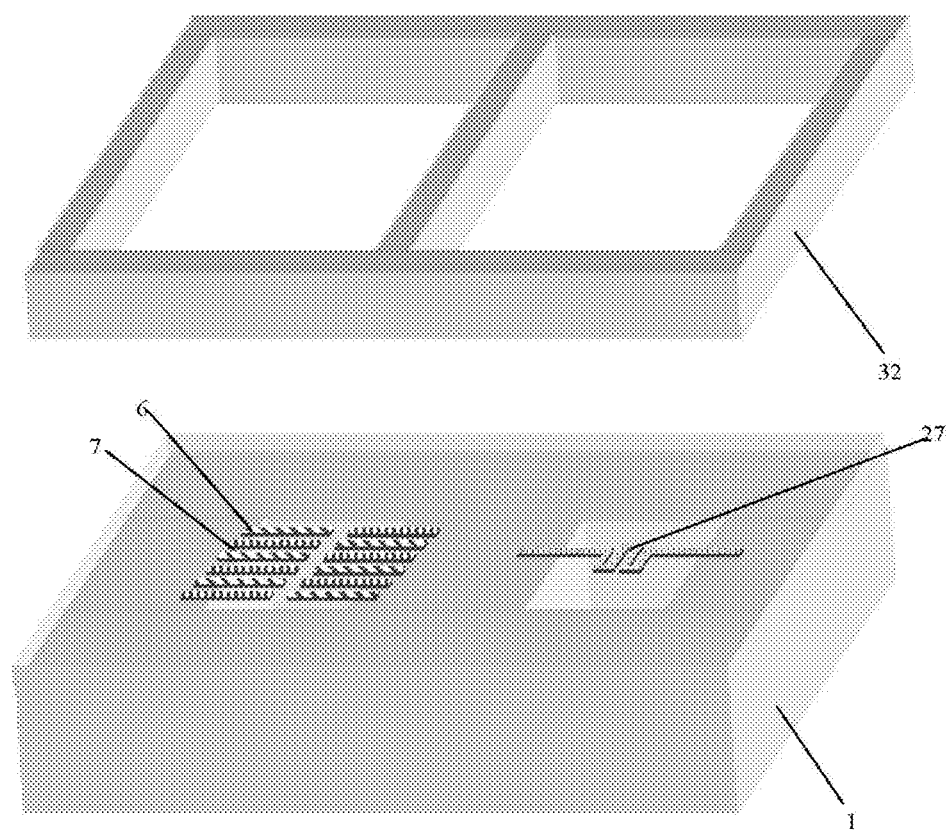
FIG. 30 shows a 3D schematic of a chip with both an IR emitter and a detector, and also shows a patterned substrate for wafer-bonding onto the chip.
Figure 31:
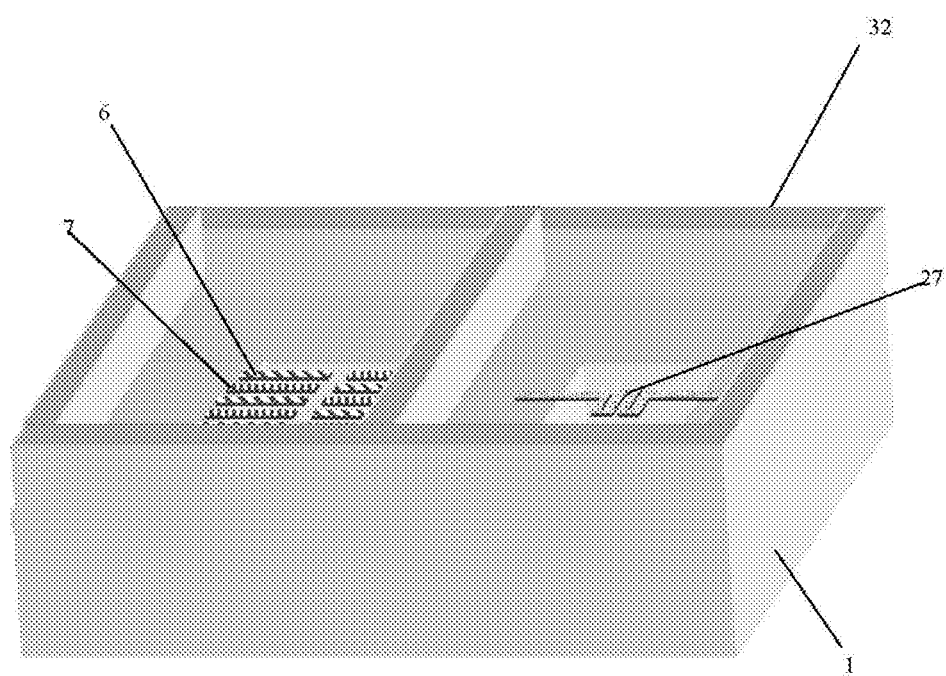
FIG. 31 shows a 3D schematic of a chip with both IR emitter and detector wafer with a substrate wafer bonded onto it to prevent IR emission travelling directly from the emitter to the detector.

FIGS. 30 and 31 show a wafer bonding technique to ensure that no IR radiation travels in a short path between the source and detector. For this purpose a substrate 32 is patterned and wafer bonded on the chip so as to create a partition between the source and detector.

Figure 32:
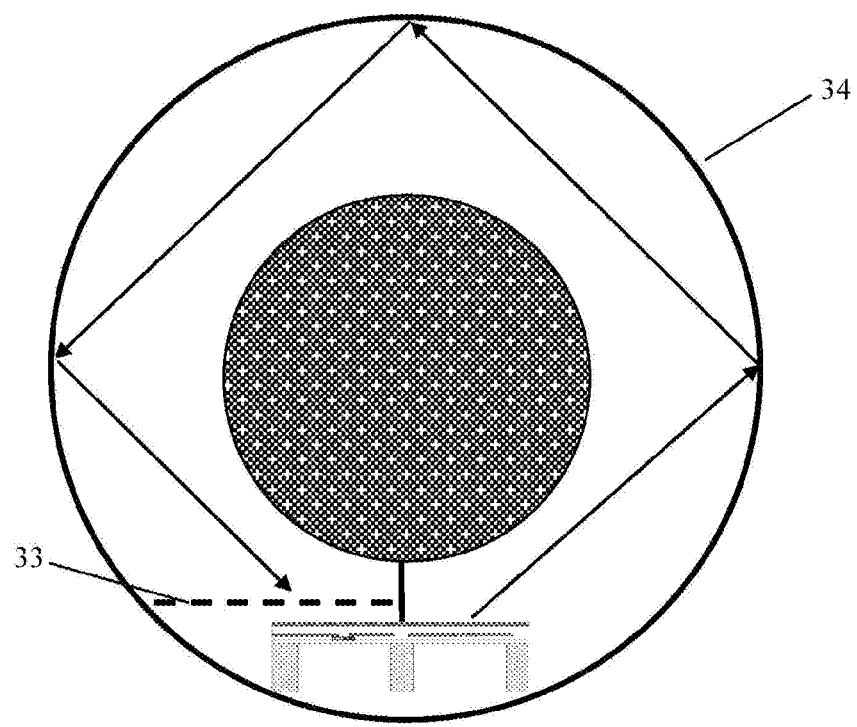
FIGS. 32, 33 show the chip packaged as an NDIR sensor.

FIG. 32 shows a schematic plan view of the chip in a circular package 34 for use as an NDIR sensor. It consists of a circular optical path from the IR source on the chip to the IR detector. The sidewalls of the path are made from a reflective material to allow the IR radiation to reflect off it to the detector. An optical filter 33 is packaged near the detector to only allow the wavelengths of interest through.

Figure 33:
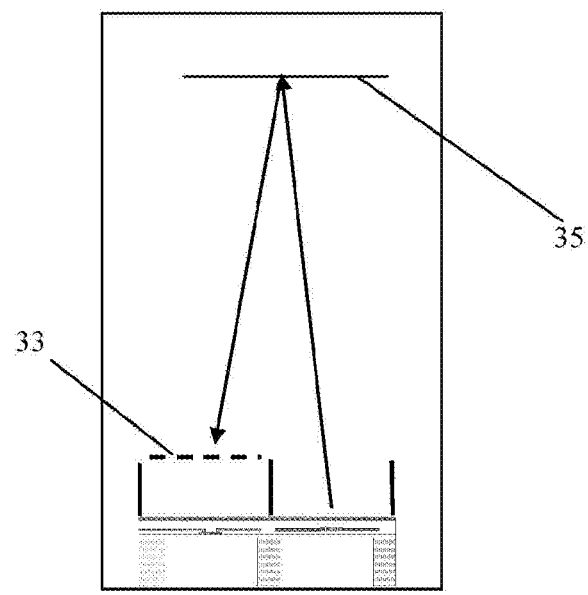

FIG. 33 shows a schematic plan view of the chip in a rectangular package with a reflective surface 35 at the far end to reflect the emission to the detector.

The invention claimed is:

1. An Infra-Red (IR) detector comprising:
    a thermopile, the thermopile comprising a plurality of thermocouples connected together on a dielectric membrane fabricated in a CMOS Silicon on Insulator (SOI) process;
    wherein each thermocouple comprises at least first and second dissimilar materials in which the first material is made of a single crystal silicon layer, and the single crystal silicon layer is a standard layer used in the CMOS SOI process.

2. The IR detector according to claim 1, wherein the single crystal silicon layer is an N+ doped or P+ doped single crystal silicon layer.

3. The IR detector according to claim 2, wherein said N+ or P+ layer forms a source layer or a drain layer of an n-channel or p-channel MOSFET integrated on the same chip as the IR detector.

4. The IR detector according to claim 1, wherein the plurality of thermocouples are connected together in series.

5. The IR detector according to claim 1, wherein the second material is selected from a group comprising:
    a single crystal silicon layer having opposite doping polarity of the first material;
    polysilicon; and
    a CMOS metal including any of aluminium, copper, titanium and tungsten.

6. The IR detector according to claim 5, wherein the second material is a single crystal silicon P+ or N+ layer.

7. The IR detector according to claim 5, wherein the second material is a single crystal silicon layer or a polysilicon layer and the first material is electrically connected to the second material by a CMOS interconnect metal.

8. The IR detector according to claim 5, wherein the second material is a single crystal silicon layer, and a polysilicon layer is used between the first and second materials so as to self-align the doping of the single crystal silicon layers to optimise spacing between them.

9. The IR detector according to claim 5, wherein the second material is a single crystal silicon layer and there is no spacing between the first and second materials of each thermocouple.

10. The IR detector according to claim 5, wherein the second material is a single crystal silicon layer and there is spacing between the first and second materials of each thermocouple.

11. The IR detector according to claim 1, further comprising a polysilicon gate on top of the single crystal silicon layer, wherein the polysilicon gate is arranged to create an inversion layer in the single crystal silicon layer.

12. The IR detector according to claim 1, wherein each thermocouple further comprises first and second thermal junctions, the first thermal junction being a hot junction and the second thermal junction being a cold junction.

13. The IR detector according to claim 12, wherein the first junction is located on the membrane and the second junction is located outside the membrane.

14. The IR detector according to claim 1, wherein the membrane is formed by a process chosen from DRIE, anisotropic wet etching, KOH and TMAH.

15. The IR detector according to claim 1, wherein the membrane has any one of a rectangular shape, a rectangular shape with rounded corners, a hexagonal shape and a circular shape.

16. The IR detector according to claim 1, wherein the thermocouples are arranged in two rows on the membrane.

17. The IR detector according to claim 1, wherein the thermocouples are arranged such that some thermocouples extend to the centre of the membrane.

18. The IR detector according to claim 1, wherein none of the thermocouples extends to the centre of the membrane.

19. The IR detector according to claim 1, further comprising a heater on the membrane.

20. The IR detector according to claim 19, wherein the heater is any one of:
    a resistive heater made of polysilicon;
    n or p doped single crystal silicon; and
    a CMOS metal such as aluminium, tungsten or titanium.

21. The IR detector according to claim 1, further comprising a temperature sensor on the membrane.

22. The IR detector according to claim 21, wherein the temperature sensor is any one of:
    a diode (thermodiode);
    a transistor arranged in a diode configuration (thermotransistor); and
    a circuit based on a thermodiode or thermotransistor.

23. The IR detector according to claim 21, wherein the temperature sensor is a resistor made of single crystal silicon, polysilicon or an interconnect metal used in the SOI process.

24. The IR detector according to claim 1, wherein the membrane comprises one or more layers made from:
    single crystal silicon;
    polysilicon; and
    a CMOS metal including any of aluminium, tungsten and titanium.

25. The IR detector according to claim 1, wherein the membrane comprises a top passivation layer which comprises silicon dioxide or silicon nitride.

26. The IR detector according to claim 25, further comprising a top metal heat spreading plate which is exposed by etching away the passivation layer.

27. The IR detector according to claim 1, wherein a top surface on the membrane is provided with a coating comprising a material selected from a group including polymer, carbon black, carbon nanotubes, graphene, and a material with high IR emissivity.

28. The IR detector according to claim 1, further comprising a mesh of a CMOS metal placed on top of the thermopile to increase the sensitivity, and wherein the mesh size is chosen to filter the desired signal at particular wavelengths and/or to increase the signal at particular wavelengths.

29. The IR detector according to claim 1, further comprising dots of a CMOS metal placed on top of the thermopile to increase the sensitivity, and wherein the size of the dots and the distance between the dots are chosen to filter the desired signal at particular wavelengths and/or to increase the signal at particular wavelengths.

30. The IR detector according to claim 1, further comprising a temperature sensor on the same chip as the detector, the temperature sensor comprising any one of:
   a diode (thermodiode);
   a transistor (thermotransistor);
   a resistor made from single crystal silicon, polysilicon or a CMOS metal; and
   a standard temperature sensing circuit such as VPTAT or IPTAT.

31. The IR detector according to claim 1, further comprising one or more of a voltage follower circuit, an amplifier circuit and a read-out analogue or digital circuit on the same chip as the detector.

32. The IR detector according to claim 1, formed as an array of IR detectors.

33. The IR detector according to claim 32, configured so that all the detectors in the array are connected together in series or parallel and are operable at the same time or individually.

34. The IR detector according to claim 1, further comprising an IR filter attached by means of wafer bonding.

35. The IR detector according to claim 34, wherein the IR filter comprises a chip or wafer etched by DRIE to from one or more membranes comprising one or more of silicon dioxide and/or silicon nitride.

36. The IR detector according to claim 1, packaged with an IR filter.

37. A Non Dispersive Infra-Red (NDIR) sensor comprising the IR detector according to claim 1 on a chip and an IR source on a second membrane on the same chip.

38. An NDIR sensor according to claim 37, wherein the IR source comprises a resistive heater on the second membrane, and the heater is made of single crystal silicon, polysilicon or a CMOS metal including any of aluminium, tungsten and titanium.

39. An NDIR sensor according to claim 38, wherein the IR source comprises a mesh made of a CMOS metal placed on top of the resistive heater to increase the emissivity, and wherein the mesh size is chosen to filter the desired signal at particular wavelengths and/or to increase the emission at particular wavelengths.

40. An NDIR sensor according to claim 38, wherein the IR source comprises dots of a CMOS metal placed on top of the resistive heater to increase the emissivity, and wherein the size of the dots and the distance between the dots are chosen to filter the desired signal at particular wavelengths and/or to increase the emission at particular wavelengths.

41. An NDIR sensor according to claim 37, further comprising a partition created by a structure of via and metal layers between the IR source and detector.

42. An NDIR sensor according to claim 37, further comprising a partition created above the chip by wafer bonding of a patterned substrate.

43. An NDIR sensor according to claim 37, further comprising a partition created above the chip during packaging of the chip.

44. An NDIR sensor according to claim 37 wherein the NDIR chip is packaged in a cylindrical package such that there is a circular optical path from the source to the detector.

45. An NDIR sensor according to claim 37, further comprising an IR filter in an optical path of a package comprising the chip.

46. An NDIR sensor according to claim 37, further comprising a particle filter.

47. An NDIR sensor according to claim 37, further comprising a high emissivity material selected from a group comprising a polymer, carbon nanotubes, graphene, metal films, metal blacks and thin film stacks on the IR source membrane.

48. A method of manufacturing an Infra-Red (IR) detector using a CMOS Silicon on Insulator (SOI) process, the method comprising:
   forming a substrate;
   forming a dielectric membrane on the substrate,
   forming a thermopile comprising a plurality of thermocouples connected together on the dielectric membrane,
   wherein each thermocouple comprises at least first and second dissimilar materials in which the first material is made of a single crystal silicon layer and the single crystal silicon layer is a standard layer used in the CMOS SOI process.

* * * * *